E. W. BULLOCK, S. H. EARL AND G. H. BRYAN.
BRACE FOR GEAR CUTTING MACHINES.
APPLICATION FILED MAY 8, 1920.

1,373,407.

Patented Apr. 5, 1921.
2 SHEETS—SHEET 1.

INVENTORS
Edward W. Bullock
Schuyler H. Earl
BY George H. Bryan
Their ATTORNEY

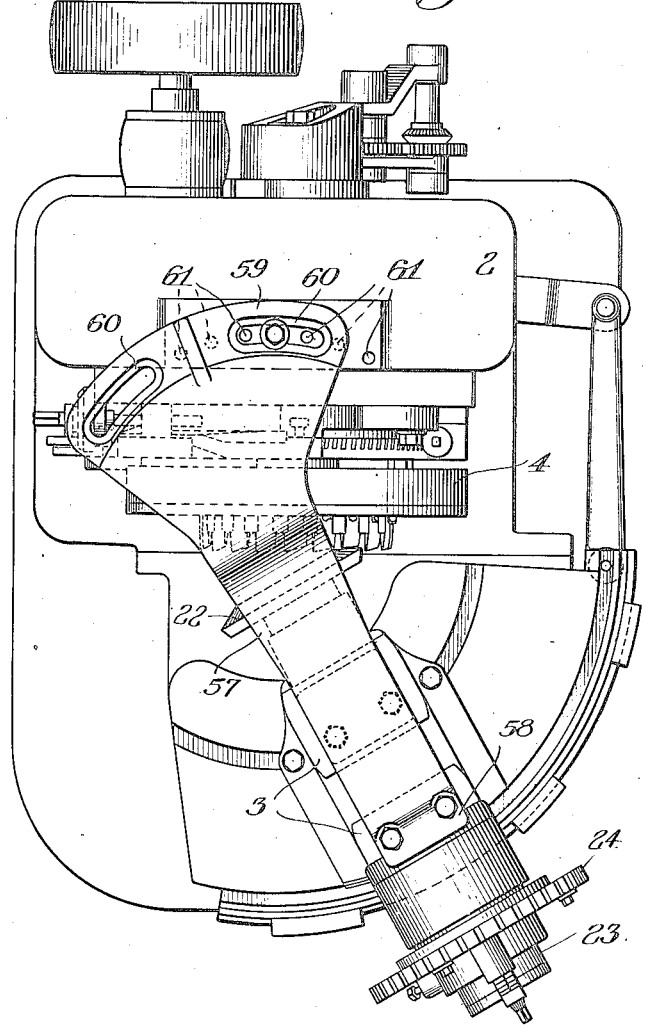

UNITED STATES PATENT OFFICE.

EDWARD W. BULLOCK, SCHUYLER H. EARL, AND GEORGE H. BRYAN, OF ROCHESTER, NEW YORK, ASSIGNORS TO GLEASON WORKS, OF ROCHESTER, NEW YORK, A CORPORATION OF NEW YORK.

BRACE FOR GEAR-CUTTING MACHINES.

1,373,407.     Specification of Letters Patent.     Patented Apr. 5, 1921.

Original application filed November 30, 1917, Serial No. 204,686. Divided and this application filed May 8, 1920. Serial No. 379,719.

*To all whom it may concern:*

Be it known that we, EDWARD W. BULLOCK, SCHUYLER H. EARL, and GEORGE H. BRYAN, all of Rochester, in the county of Monroe and State of New York, have invented certain new and useful Improvements in Braces for Gear-Cutting Machines; and we do hereby declare the following to be a full, clear, and exact description of the same, reference being had to the accompanying drawings, forming a part of the specification, and to the reference-numerals marked thereon.

This application is a division of our co-pending application No. 204,686, filed November 30, 1917, for gear cutting machines.

The object of this invention is to provide means for adequately bracing and strengthening the frame of the gear cutting machine so as to bring about a more rigid relation between the gear blank and cutter supports, thus increasing the speed of production and obviating in a large measure any irregularities or imperfect surfaces on the finished blank. To these and other ends the invention resides in certain improvements and combinations of parts, all as will be hereinafter more fully described, the novel features being pointed out in the claims at the end of the specification.

In the drawings:

Fig. 2 is a plan view of the parts in normal cutting relation for producing a bevel gear.

Similar reference characters throughout the several views indicate the same parts.

Figure 1:
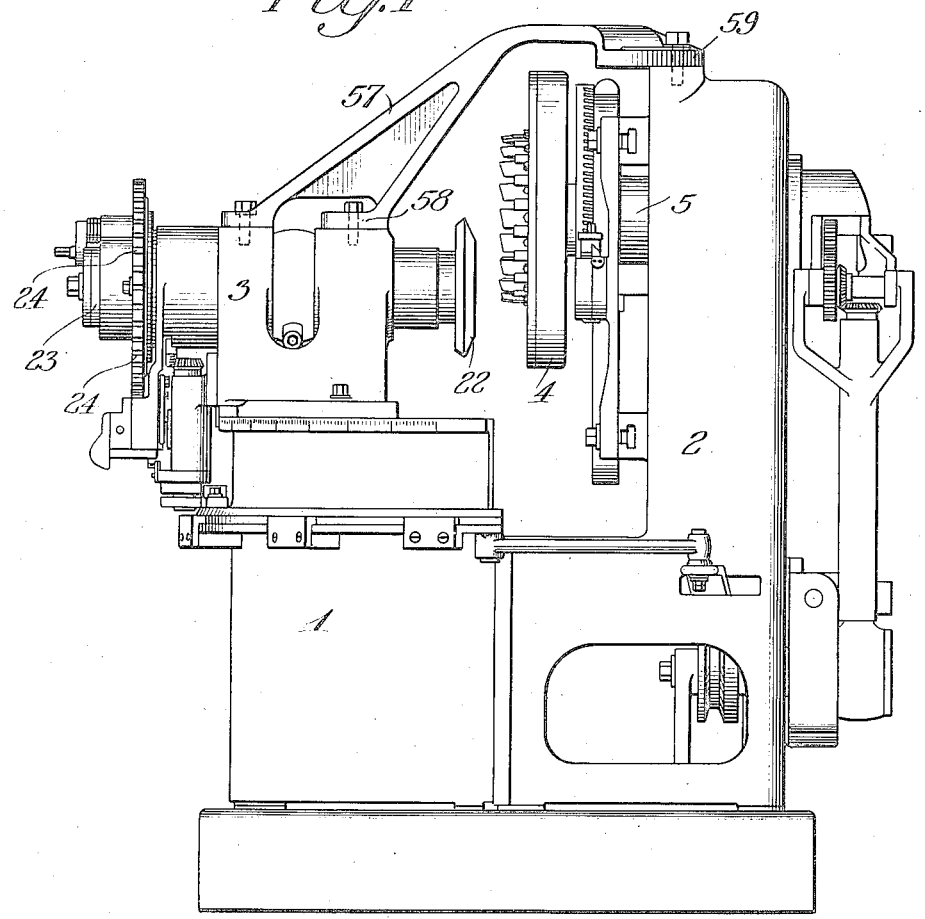
Figure 1 is a side elevation of an apparatus constructed in accordance with a practicable embodiment of the invention, and showing the cutter and blank supports adjusted out of cutting relation.

The present invention is shown applied to a gear cutting machine in which there is no generating or rolling motion given to the gear blank during the cutting operation, but it will be seen that this invention may be applied to such machines if desired, and in the drawing is shown as embodied in a gear cutting machine of the general type in which the blank is indexed by successive operations when the cutter is retracted from the blank after each tooth space is completed.

The structure shown in Fig. 1 comprises a base 1, a standard 2 comprising the support for the cutter mechanism and a standard or support 3 in which the work spindle is mounted. The cutter head is designated by 4 and is mounted on a spindle within the standard 2. The cutter is reciprocated at predetermined intervals to withdraw the same from the blank in accordance with the mechanism shown in the pending application of Edward W. Bullock and George H. Bryan, Serial No. 173,313, filed June 7, 1917. The blank 22 is fixed upon the spindle 23 and the latter carries an index wheel 24 which is fixed thereto in the usual manner or by any convenient means that permit of adjusting the index wheel with reference to the blank spindle and holding the parts fixedly in adjusted position. In operation the blank remains stationary, while the cutter rotates for a predetermined period to complete a tooth face, after which the cutter is withdrawn and the blank is indexed or automatically turned through a distance until in a position for cutting the next tooth, when the cutter is returned to its operative position, as fully described in the parent application referred to.

In order to obtain uniform cutting and increase the speed of production, we provide means for securing a rigid relation between the cutter support and the blank spindle support. This means consists of a bracing member connecting the two supports and extending around the blank and cutter, and preferably overhead, with reference thereto. This device is shown in the form of a brace having its lower end 58 bolted to the blank spindle support 3, its upper end 59 bolted to the top of the standard 2 in which the cutter is mounted, and its central portion 57 extending above the space occupied by the cutter and blank. To provide for different pitch cone angles of bevel gears, the blank spindle support 3 is adjustable upon the base as usual in this class of machinery, the normal cutting position being shown in Fig. 2. To permit this adjustment, the upper end 59 of the brace 57 is slotted at 60 for adjustably receiving one or more bolts carried in a series of bolt holes 61 in the standard 2. An examination of the drawings will disclose that the bolt holes 61 in the standard 2 and the coöperating slots 60 are arranged on an arc of a circle about the apex of the pitch cone of the blank. After the position of the blank is once determined and adjusted for any given cutter, the brace is fixedly bolted in place and thereafter serves to retain the cutter support and the blank spindle support firmly in relative position. This connecting brace is of great advantage in holding the blank and cutter in the proper relationship, which prevents any chatter and results in accurate, smooth and uniformly finished surfaces and makes feasible a considerably greatly increased cutting speed.

We claim as our invention:

1. In a gear cutting machine, the combination with a blank support and a cutter support, of a brace, the ends of which are attached to the blank and cutter supports and the central portion of which extends around the area occupied by the gear blank and cutter.

2. In a gear cutting machine, the combination with a blank support and a cutter support, of a brace, the ends of which are adjustably attached to one of said supports and the central portion of which extends above the area occupied by the gear blank and cutter.

3. In a gear cutting machine, the combination with a blank support and blank spindle, of a cutter support and cutter spindle thereon, and an overhead brace connecting the cutter and blank supports.

4. In a gear cutting machine, the combination with a base, of a blank support and cutter support mounted on the base, one having means for adjusting its position with reference to the other, of a brace connecting the cutter and blank supports and having adjustable means permitting its position to be changed in accordance with a relative adjustment of the blank and cutter supports.

5. In a gear cutting machine, the combination with a base, of a blank support and cutter support mounted on the base, one having means for adjusting its position with reference to the other, cutter and blank spindles mounted on said supports, and an overhead brace connecting the cutter and blank carrying supports, the brace extending above the cutter and blank spindles, and having adjustable means permitting its position to be changed in accordance with a relative adjustment of the blank and cutter supports.

6. In a gear cutting machine, the combination with a base of a bevel gear blank support thereon, a cutter support mounted upon the base, one of said supports having means for adjusting its angular position with reference to the axis of the other, and a brace connecting the cutter and blank supports rigidly secured to both of said supports but adjustably secured to one of them on an arc of a circle about the apex of the pitch cone of the blank as center.

7. In a gear cutting machine, the combination with a base of a bevel gear blank support thereon, a cutter support mounted on the base, one of said supports being provided with adjusting means for changing the angle between its axis and the axis of the other support, and a brace connecting the cutter and blank supports rigidly secured to each support and adjustable about the apex of the pitch cone of the blank as center.

EDWARD W. BULLOCK.
SCHUYLER H. EARL.
GEORGE H. BRYAN.